Patented Sept. 2, 1941

2,254,609

UNITED STATES PATENT OFFICE 2,254,609

LEAKAGE INDICATOR COMPOSITION

William W. Kinzer, Lancaster, Pa., assignor to Armstrong Cork Company, Lancaster, Pa., a corporation of Pennsylvania No Drawing. Application February 4, 1938, Serial No. 188,783

5 Claims. (Cl. 252—379)

My invention relates to a composition of matter and, more particularly, to a paint-like composition designed to be applied to the surfaces of liquid handling equipment, which, when set, indicates liquid leakage. My invention is hereinafter described with particular reference to a paint-like composition designed for application to the surfaces of oil or water handling equipment to indicate leakage. The term "handling equipment" may include oil lines, apparatus for testing leakage characteristics of gasket materials, flanges, fittings, or, in fact, any equipment in which immediate detection of liquid leakage is requisite.

My invention has for its chief object to provide a liquid leakage indicator for liquid handling equipment. An object of my invention is to provide a composition of matter easily and quickly applied to the surfaces of oil or water handling equipment to indicate leakage. A still further object is to provide a paint-like composition applicable to oil or water handling equipment which, when set, indicates liquid leakage by change of color or shade in the presence of liquid.

My invention relates to a composition of matter for application to the surfaces of liquid handling equipment to indicate liquid leakage which comprises a substance adapted to stain the composition when dissolved by escaping liquid and a material adapted to impart a definite color to the composition, liquid leakage being indicated immediately upon its occurrence by staining of the composition. More specifically, my composition comprises a dye soluble in the liquid to be detected and a pigment to impart a definite color to the composition, suspended in a vehicle in which such dye is insoluble, liquid leakage being indicated when the composition is set by staining thereof. In other words, if my composition be used to detect oil leakage, I use an oil soluble dye suspended in a paint or other vehicle in which the dye is insoluble; if my composition be used to indicate water leakage, I use a water soluble dye suspended in an oil paint or other vehicle in which the dye is insoluble.

Describing my invention with reference to a composition applicable to oil handling equipment to indicate oil leakage or the presence of oil, such composition may comprise a pigment, an oil soluble substance, preferably a dye, adapted to stain the composition when dissolved by escaping oil, and a filler, suspended in an aqueous vehicle. It is understood, of course, the filler may be omitted since it is used primarily to decrease the cost of the composition. The dye, being oil soluble, is dissolved by escaping oil, and stains or changes the color of the applied composition. A composition satisfactory for my purposes may be formed as follows, the percentages being by weight:

| | Per cent |
|---|---|
| Oil soluble dye | 1 |
| Titanium dioxide | 40 |
| Whiting | 59 |

The dye and titanium dioxide in dry powdered form are mixed together in a mortar or ball mill, depending upon the quantity of composition to be manufactured, and the whiting is then added to the mix. A thin glue solution is made and slowly mixed in the composition as a vehicle for the powdered ingredients, the glue serving as a binder for such ingredients when the composition is set. I prefer to add the solution to the dry mix since there is less likelihood of lumps being formed during the mixing; if desired, of course, the dry mix may be added to the solution. Either animal or vegetable glue may be used; preferably, the solution comprises 5 parts of glue to each 100 parts of water. If desired, a casein solution may be used as a vehicle; such solution may comprise approximately 7½–12 parts casein to each 88–92½ parts of water.

The above mixture produces a white, paint-like composition. For ready application to the surfaces of oil handling equipment it is preferred that the composition be "thin" to permit it to be painted on such surfaces.

As an oil soluble dye, I use Sudan III, a red dye well-known to the industry and one which may be procured on the open market. Other oil soluble but water insoluble dyes may be used in its place without affecting the oil indicating characteristics of the composition, for example, "Typophor Black FB," an oil soluble dye manufactured by the General Dyestuff Corporation. Other pigments may be substituted in whole or in part for titanium dioxide, for example, lithopone, white lead, zinc oxide and the like. It is desirable to use a filler such as whiting, china clay, barytes, etc., to serve as an extender for the dye and such use also decreases the cost of the compound without affecting the oil indicating characteristics thereof.

The above description of equivalent ingredients, of course, is based on the fact that I desire my composition to be white in color when applied to oil handling equipment, which, although not essential, is highly desirable since slight stains or changes in color thereof may be more readily detected. It should be understood that various colored compositions may be used with satisfactory results, bearing in mind, that my invention consists in part in incorporating an oil soluble substance in the composition, which stains or changes the color of the composition upon oil leakage.

It is desirable to add a preservative to the above composition. I have found phenol, in an amount approximating 1% of the mix, is satisfactory for this purpose. Other preservatives may be used in place of phenol if desired, for example, sodium ortho-phenol-phenate, formaldehyde or formalin.

A composition satisfactory for indicating water leakage may be formed as follows, the percentages being by weight:

| | Per cent |
|---|---|
| Water soluble dye | 1 |
| Titanium dioxide | 40 |
| Whiting | 59 |

The dye and titanium dioxide in dry powdered form are mixed together in a mortar or ball mill, depending upon the quantity of composition to be manufactured, and whiting is then added to the mix. A light bodied varnish or bronzing liquid is made and slowly mixed in the composition as a vehicle for the powdered ingredients, and also serves as a binder for such ingredients when the composition has set. Such vehicle may comprise approximately 30% tung oil, 15% resin (natural or synthetic), 25% turpentine and 30% petroleum solvent. For ready application to the surfaces of water handling equipment, it is preferred that the composition be "thin" to permit it to be painted over such surfaces.

As a water soluble dye, I use Aniline Blue, a dye well known to the industry and one which may be procured on the open market. Other water soluble but oil insoluble dyes may be used in its place without affecting the water indicating characteristics of the composition, for example, Naphthol Green, Malachite Green, or Benzyl Violet. Other pigments and fillers may also be used if desired as described above.

Heretofore, it has been extremely difficult to detect small leaks in liquid handling equipment. My invention is highly efficient in use and permits small leaks to be readily detected merely by observation of the color of the composition. The composition is inexpensive to manufacture and involves no excessive labor charges in application.

While I have disclosed and claimed preferred embodiments of my invention, it will be understood that it is not limited to such forms, since it may be otherwise embodied within the scope of the following claims.

I claim:

1. A leakage indicator for application to the surfaces of liquid handling equipment adapted, when dry, to detect leakage of a contained liquid selected from a class consisting of oil and water immediately after its occurrence, which comprises a composition including a pigment, a binder, and a dye soluble in the contained liquid suspended in a vehicle in which the dye is insoluble, at least a portion of said dye being instantly dissolvable by escaping liquid to stain the applied composition thereby indicating liquid leakage immediately upon its occurrence.

2. A leakage indicator for application to the surfaces of oil handling equipment adapted, when dry, to indicate oil leakage immediately after its occurrence, which comprises a composition including a pigment and an oil soluble dye suspended in a vehicle in which the dye is insoluble, at least a portion of said dye being instantly dissolvable by escaping oil to stain the applied composition thereby indicating oil leakage immediately upon its occurrence.

3. A leakage indicator for application to the surfaces of water handling equipment adapted, when dry, to indicate water leakage immediately after its occurrence, which comprises a composition including a pigment, a binder, and a water soluble dye suspended in a vehicle in which said water soluble dye is insoluble, at least a portion of said dye being instantly dissolvable by escaping water to stain the applied composition thereby indicating water leakage immediately upon its occurrence.

4. A leakage indicator for application to the surfaces of water handling equipment adapted, when dry, to indicate water leakage immediately after its occurrence, which comprises a pigment and a water soluble dye in powdered form suspended in a vehicle in which said dye is insoluble, said vehicle including approximately 30% tung oil, 15% resin, 25% turpentine, and 30% petroleum solvent, at least a portion of said dye being instantly dissolvable by escaping liquid thereby indicating water leakage immediately upon its occurrence.

5. A leakage indicator for application to the surfaces of oil handling equipment adapted, when dry, to indicate oil leakage immediately after its occurrence, comprising a pigment, phenol and an oil soluble dye in powdered form suspended in a vehicle in which said dye is insoluble, said vehicle including a solution of glue and water, at least a portion of said dye being instantly dissolvable by escaping oil thereby indicating oil leakage immediately upon its occurrence.

WILLIAM W. KINZER.